United States Patent
Takahashi

(10) Patent No.: US 7,235,036 B2
(45) Date of Patent: Jun. 26, 2007

(54) LOCKUP CONTROL APPARATUS AND METHOD FOR VEHICULAR TORQUE CONVERTER

(75) Inventor: Tomohiko Takahashi, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 205 days.

(21) Appl. No.: 11/004,865

(22) Filed: Dec. 7, 2004

(65) Prior Publication Data

US 2005/0137059 A1   Jun. 23, 2005

(30) Foreign Application Priority Data

Dec. 18, 2003   (JP)   .............................. 2003-420460

(51) Int. Cl.
 *B60W 10/02*   (2006.01)
(52) U.S. Cl. ...................................... 477/174; 477/180
(58) Field of Classification Search ................ 477/174, 477/175, 176, 177, 180; 192/3.3, 3.31
See application file for complete search history.

(56) References Cited

U.S. PATENT DOCUMENTS 5,651,752 A * 7/1997 Wakahara et al. .......... 477/181
5,935,043 A * 8/1999 Watanabe et al. ........... 477/169
5,947,865 A   9/1999 Watanabe et al.
6,152,852 A * 11/2000 Sakakibara et al. ......... 477/175
6,663,533 B2 * 12/2003 Toyoda et al. ................ 477/62
2002/0175036 A1 * 11/2002 Takatori et al. .............. 192/3.3

FOREIGN PATENT DOCUMENTS

| JP | 10-141492 A | 5/1998 |
|---|---|---|
| JP | 10-299887 A | 11/1998 |
| JP | 11-159608 A | 6/1999 |
| JP | 11-182672 A | 7/1999 |

* cited by examiner

*Primary Examiner*—Charles A Marmor
*Assistant Examiner*—Justin K. Holmes
(74) *Attorney, Agent, or Firm*—Foley & Lardner LLP

(57) ABSTRACT

In a lockup control apparatus and method for a vehicular torque converter, the torque converter is controlled to be under a steady-state lockup state by a lockup clutch during a steady-state traveling state, and the torque converter is controlled to be under a coast lockup state during a coasting state where an accelerator opening angle is completely closed, and a lockup state is released when an engine speed becomes equal to or lower than a predetermined lockup release rotational speed. Moreover, an actual lockup release time between a time point when a lockup release command for releasing the lockup state is outputted and a time point when the lockup clutch becomes completely released is calculated, and the lockup release rotational speed is set on the basis of the calculated actual lockup release time.

12 Claims, 6 Drawing Sheets

LOCKUP CONTROL APPARATUS AND METHOD FOR VEHICULAR TORQUE CONVERTER

BACKGROUND OF THE INVENTION a) Field of the Invention

The present invention relates to lockup control apparatus and method for a vehicular torque converter with which an automatic transmission is provided, having a lockup mechanism for establishing a direct connection between input and output elements of the torque converter. Specially, the present invention relates to a lockup control for releasing a lockup (state) according to an engine speed while a vehicle is coasting (or, during a coasting state).

b) Description of the Related Art

The torque converter transmits a driving power between input and output elements of the torque converter via a working fluid. Hence, a power transfer efficiency in the torque converter is normally low although a torque fluctuation absorbing function and a torque increasing function are achieved. Therefore, a lockup-type torque converter, which is provided with a lockup clutch for establishing a lockup state where input and output elements of the torque converter are directly connected, is commonly used.

In the vehicle equipped with such a lockup-type torque converter, when the vehicle starts to coast with an accelerator opening angle being completely closed, the lockup state is generally applied so as to mainly improve an energy consumption. The lockup state in this situation is hereinafter called a coast lockup. In this coast lockup state, suppose that a lockup clutch engagement differential-pressure that is applied to the lockup clutch is kept the same high pressure as at the time of an ordinary lockup. In this case, when the vehicle rapidly decelerates and wheels are locked while coasting, a release of the lockup for the lockup clutch tends to be delayed. Hence, there is a possibility that an engine stall may be caused by the locked wheels.

With this fact taken into consideration, a Japanese Patent Application First Publication No. 1999-182672 published on Jul. 6, 1999 exemplifies a previously proposed lockup control apparatus in which the lockup clutch engagement differential-pressure (or, pressure-differential) in the coast lockup state (hereinafter, also called a coast lockup differential-pressure) is set to lower than the lockup clutch engagement differential-pressure of a steady-state lockup applied in (or, under) a steady-state traveling state or a slow accelerating state.

Namely, the lockup clutch engagement differential-pressure in the steady-state traveling state is set to be a high differential-pressure almost near a maximum differential-pressure in order to avoid a slipping of the lockup clutch. Then, after the vehicle begins to coast with the accelerator opening angle (detected by an accelerator pedal) being completely closed (detected by an idling switch), the lockup clutch engagement differential-pressure in the coast lockup state (or, the coast lockup differential-pressure) is controlled to be a sufficiently low differential-pressure within a range where the lockup clutch does not judder.

Moreover, a Japanese Patent Application First Publication No. 1999-159608 published on Jun. 15, 1999 exemplifies another previously proposed lockup control apparatus. The above-described Japanese Patent Application First Publication teaches that a controller determines whether the lockup clutch generates a minute slipping in the coast lockup state, and the coast lockup differential-pressure is so corrected (or, updated) and learned as to become smaller gradually while the minute slipping is not detected. In this previously proposed lockup control apparatus, after the process of the correction and learning proceeds enough, the coast lockup differential-pressure can become smaller close to a limit of a range where the minute slipping is not generated even if there is some disparity in a differential-pressure control system. Hence, the release of the lockup is quickly performed when the vehicle is braked suddenly.

SUMMARY OF THE INVENTION

In the later previously proposed lockup control apparatus disclosed in the above-described Japanese Patent Application First Publication No. 1999-159608, relatively long time of coasting (or traveling) is needed in order to learn and update a limit coast lockup differential-pressure correctly. However, the cases where the coasting continues for a long time are rare in actual traveling. Moreover, in the later previously proposed lockup control apparatus, the limit coast lockup differential-pressure is so updated and learned as to become smaller gradually from relatively large differential-pressure in an early stage. Hence, the release of the lockup at the time of sudden braking still tends to be delayed before the updating and learning proceed enough. So, there is still the fear that the engine stall may be caused.

It is, therefore, an object of the present invention to provide lockup control apparatus and method for the torque converter which are capable of assuredly avoiding the engine stall at the time of sudden braking before the above-described updating and learning of the coast lockup differential-pressure are completed enough, by setting a lockup releasing rotational speed appropriately.

According to one aspect of the present invention, there is provided a lockup control apparatus for a vehicular torque converter, comprising: a lockup clutch; a differential-pressure controlling section that controls a differential-pressure between an apply-pressure to the lockup clutch and a release-pressure thereto during a steady-state traveling state in such a manner that the torque converter is under a steady-state lockup state where input and output elements of the torque converter are directly connected therebetween by the lockup clutch, controls the differential-pressure during a coasting state where an accelerator opening angle is completely closed in such a manner that the torque converter is under a coast lockup state where the differential-pressure is lower than a steady-state lockup differential-pressure, and controls the differential-pressure when an engine speed becomes equal to or lower than a lockup release rotational speed in such a manner that the lockup state is released; an actual lockup release time calculating section that calculates an actual lockup release time from a time point at which a lockup release command to release the lockup state is outputted to a time point at which the lockup clutch becomes actually released; and a lockup release rotational speed setting section that sets the lockup release rotational speed on the basis of the actual lockup release time calculated by the actual lockup release time calculating section.

According to another aspect of the invention, there is provided a lockup control method for a vehicular torque converter, comprising: controlling a differential-pressure between an apply-pressure to a lockup clutch and a release-pressure thereto during a steady-state traveling state in such a manner that the torque converter is under a steady-state lockup state where input and output elements of the torque converter are directly connected therebetween by the lockup clutch; controlling the differential-pressure during a coasting state where an accelerator opening angle is completely closed in such a manner that the torque converter is under a coast lockup state where the differential-pressure is lower than a steady-state lockup differential-pressure; controlling the differential-pressure when an engine speed becomes equal to or lower than a lockup release rotational speed in such a manner that the lockup state is released; calculating an actual lockup release time from a time point at which a lockup release command to release the lockup state is outputted to a time point at which the lockup clutch becomes actually released; and setting the lockup release rotational speed on the basis of the calculated actual lockup release time.

The disclosure of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
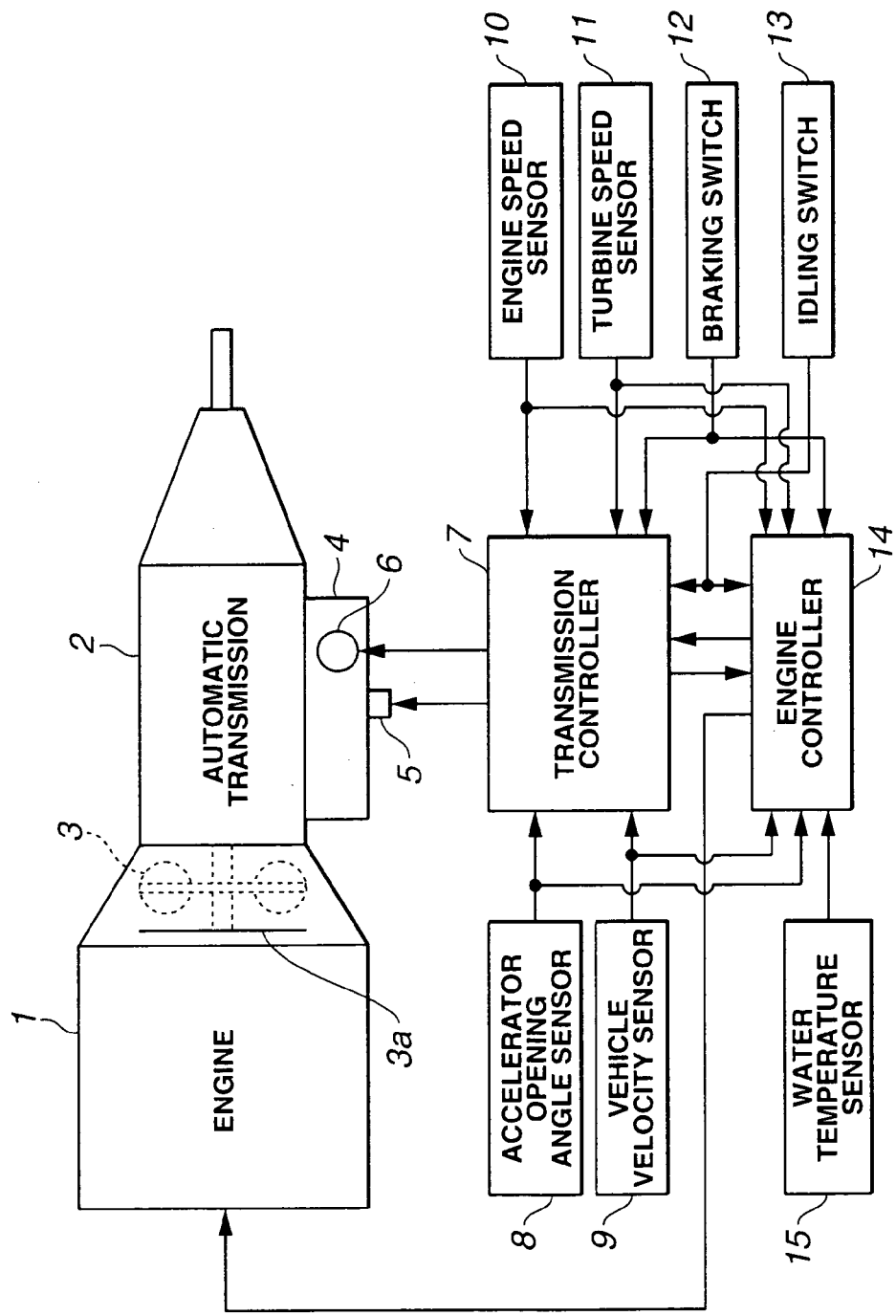
FIG. 1 is a schematic block diagram representing a configuration of a lockup control apparatus in a preferred embodiment according to the present invention.

FIG. 1 is a schematic block diagram representing a configuration of a lockup control apparatus in a preferred embodiment according to the present invention. A crankshaft of an engine 1 is coupled to an automatic transmission 2 through a torque converter 3 functioning as a power train of the vehicle. In this preferred embodiment according to the present invention, automatic transmission 2 is, for example, a five-speed transmission equipped with a planetary-gear type auxiliary shift mechanism. However, automatic transmission 2 may be a continuously variable transmission such as a belt type continuously variable transmission. Automatic transmission 2 is provided with a hydraulic circuit unit 4 configuring a hydraulic circuit for switching various interlock elements and a plurality of solenoid valves 6 that are performing a hydraulic control in accordance with the a hydraulic control signal. Automatic transmission 2 is shifted by a transmission control signal derived from a transmission controller 7 according to the traveling state (i.e., mainly a vehicle velocity and an accelerator pedal opening angle).

Torque converter 3 is provided with a lockup clutch 3a which is capable of directly connecting a pump impeller as an input element to a turbine as an output element. This lockup clutch 3a is engaged/released according to a differential pressure between an apply-pressure and a release-pressure (hereinafter, also called lockup clutch engagement differential-pressure) which is variably and continuously controlled by a duty control of a lockup solenoid 5.

Although an engine controller 14 performing various controls such as a fuel injection control or an ignition control for engine 1 is separated from transmission controller 7 in this preferred embodiment, required signals are transmitted between this engine controller 14 and transmission controller 7. A lockup control apparatus in this preferred embodiment is provided with, as sensors, for example, an accelerator opening angle sensor 8 detecting the opening angle of the accelerator pedal of the vehicle, a vehicle velocity sensor 9 detecting the vehicle velocity, an engine speed sensor 10 detecting a rotational speed of engine 1, a turbine speed sensor 11 detecting a turbine rotational speed of torque converter 3 (i.e., a rotational speed of an input shaft of automatic transmission 2), a braking switch 12 representing that a brake pedal of the vehicle has been depressed, an idling switch (or, idling SW) 13 representing that a throttle valve of engine 1 (outside of the drawing) has been completely closed, and a water temperature sensor 15 detecting temperature of cooling water of engine 1. In addition, it is determined that the accelerator opening angle is completely (or, fully) closed, while idling switch 13 is ON in this preferred embodiment. However, the accelerator opening angle may be determined to be completely closed by means of the signal detected by accelerator opening angle sensor 8.

Next, a control for lockup clutch 3a in above-described configuration will be explained below.

Figure 2:
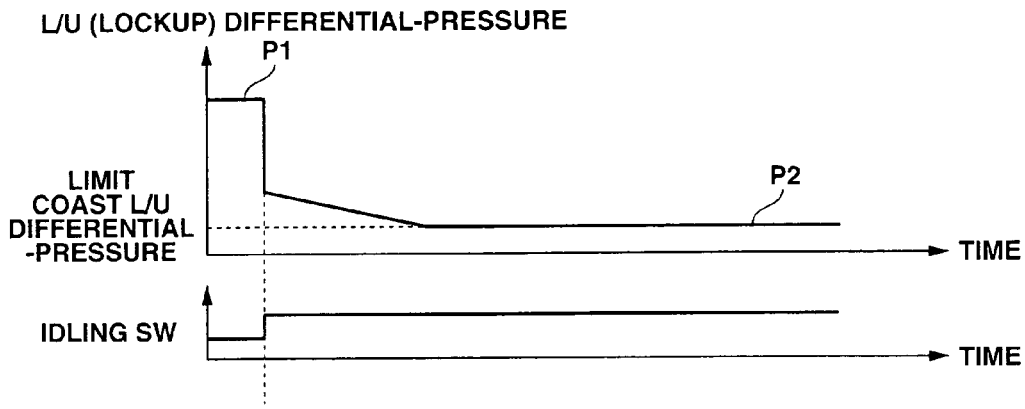
FIG. 2 is a timing chart representing a variation of a lockup clutch engagement differential-pressure after the vehicle starts coasting.

The differential pressure applied to lockup clutch 3a (namely, the lockup clutch engagement differential-pressure) can be variably controlled by the duty control of lockup solenoid 5 as described above. Hence, a switching between the lockup state and a not-lockup state of torque converter 3 (i.e., engagement/release of lockup clutch 3a) can be performed. Furthermore, an appropriate (or, various) lockup clutch engagement differential-pressure can be performed (or, controlled) in the same lockup state. Basically, the lockup clutch engagement differential-pressure is set to be a high differential-pressure almost near the maximum differential-pressure (namely, a steady-state lockup (L/U) differential-pressure P1 shown in FIG. 2) in order to avoid the slipping of lockup clutch 3a while the vehicle is traveling under the steady-state (or, regular) traveling state or the slow accelerating state. On the contrary, since a required transfer torque of lockup clutch 3a is small while the vehicle is coasting with idling switch 13 being ON, the lockup clutch engagement differential-pressure is controlled to be a sufficiently low differential-pressure within the range where the lockup clutch does not judder (namely, a limit coast lockup differential-pressure P2 shown in FIG. 2) in order to reduce a delay of hydraulic response for a lockup release command which will be outputted (or, generated) later. In more detail, just at the time when idling switch 13 is turned on, the lockup clutch engagement differential-pressure is varied in stepwise to a little higher differential-pressure than limit coast lockup differential-pressure P2 that has been established (or, updated) finally. Then, the lockup clutch engagement differential-pressure is decreased gradually while the predetermined minute slipping (for example, 10 rpm (revolutions per minute)) is not detected, and the limit differential-pressure in the coast lockup state (i.e., limit coast lockup differential-pressure P2) is updated and learned.

Next, a lockup release processing while the vehicle is decelerating will be explained below with reference to FIG. 3 and FIG. 4.

When a driver releases the accelerator pedal and idling switch 13 is turned on while traveling under the lockup state, the vehicle begins to coast keeping the lockup state. Then, a fuel which is supplied to engine 1 is cut from a time point when a predetermined delay-time (F/C delay) passes after idling switch 13 was turned on. This predetermined delay-time is, for example, set to any value between 500 milliseconds and 1000 milliseconds depending on a specification of the vehicle and the traveling state thereof and so on. In addition, the lockup differential-pressure becomes limit coast lockup differential-pressure P2 which is lower than usual lockup differential-pressure after idling switch 13 was turned on, as described above.

Figure 3:
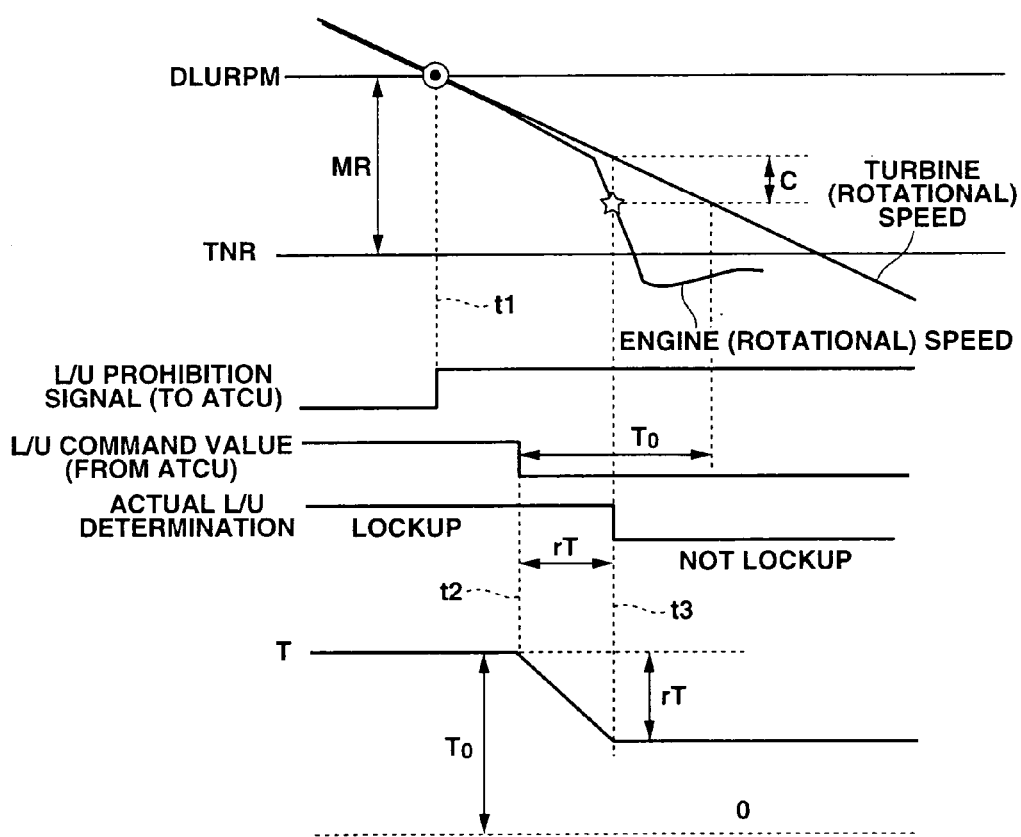
FIG. 3 is a timing chart representing a rotational speed variation and others, when a lockup release is carried out with the vehicle decelerating.

A TNR in FIG. 3 denotes a fuel-cut recovery rotational speed at which a fuel supply is resumed. TNR is, for example, about 900 rpm (revolutions per minute) in this preferred embodiment. This fuel-cut recovery rotational speed TNR is set according to the cooling water temperature detected by water temperature sensor 15.

A DLURPM denotes a lockup release rotational speed. When engine speed becomes equal to or lower than this lockup release rotational speed DLURPM, the lockup release is performed. This lockup release rotational speed DLURPM is set to a value which is the sum value of instantaneous fuel-cut recovery rotational speed TNR and a predetermined margin rotational speed MR. Margin rotational speed MR is necessary because the response delay for the lockup release is taken into consideration.

The engine speed is decreased gradually together with the turbine (rotational) speed since the vehicle is coasting with the fuel being cut. Then the engine speed reached lockup release rotational speed DLURPM at a point of a round mark (a time of t1) as shown in FIG. 3. At this point, a lockup (L/U) prohibition flag in engine controller 14 is turned on and the lockup prohibition signal is outputted from engine controller 14 to transmission controller 7. Transmission controller 7 receives the lockup prohibition signal and turns a lockup command value OFF at a time of t2 (Namely, the lockup release command is outputted). Thereby, the lockup release (i.e., the release of the lockup clutch engagement differential-pressure) is started via lockup solenoid 5.

A delay time between the time point when the lockup command value becomes OFF and a time point when lockup clutch 3a becomes actually (or, completely) released generates due to a response delay of a hydraulic system and so on. In more detail, this delay time varies depending on present limit coast lockup differential-pressure P2 and a disparity in the differential-pressure control system and so on. When a difference between the engine speed and the turbine speed reaches a predetermined value at a time point of t3, it is determined that the lockup release has been actually completed. This predetermined value is, for example, set to any value between 30 rpm and 50 rpm depending on a performance of the transmission and a present state thereof and so on. Then, an actual lockup (L/U) determination flag is turned from ON to OFF according to this determination of the actual lockup release. Namely, a slipping of lockup clutch 3a is occurring during the interval from t2 to t3. Then, the fuel supply for engine 1 is resumed when the actual lockup release is recognized at the time point of t3. In addition, the fuel supply is resumed in either of two conditions which are a condition where the difference between the engine speed and the turbine speed becomes equal to or larger than the predetermined value (namely, the determination of the actual lockup release) and a condition where the engine speed becomes equal to or lower than fuel-cut recovery rotational speed TNR.

In this preferred embodiment according to the present invention, the interval from t2 to t3 is calculated as an actual lockup release time rT. Lockup release rotational speed DLURPM is set according to this actual lockup release time rT. In detail, margin rotational speed MR which is added to instantaneous fuel-cut recovery rotational speed TNR is variably set.

FIG. 3 shows an example of a case where actual lockup release time rT is relatively short. The actual lockup release finishes before the engine speed is decreased to fuel-cut recovery rotational speed TNR. In this case where actual lockup release time rT is relatively small, margin rotational speed MR is set to be low as will be described later. Hence, lockup release rotational speed DLURPM becomes low. This newly calculated (or, updated) lockup release rotational speed DLURPM is reflected to a next time deceleration of the vehicle (i.e., the next lockup release). Therefore, for example, if limit coast lockup differential-pressure P2 has been updated and learned in enough low level, the lockup release is not started early too much.

Figure 4:
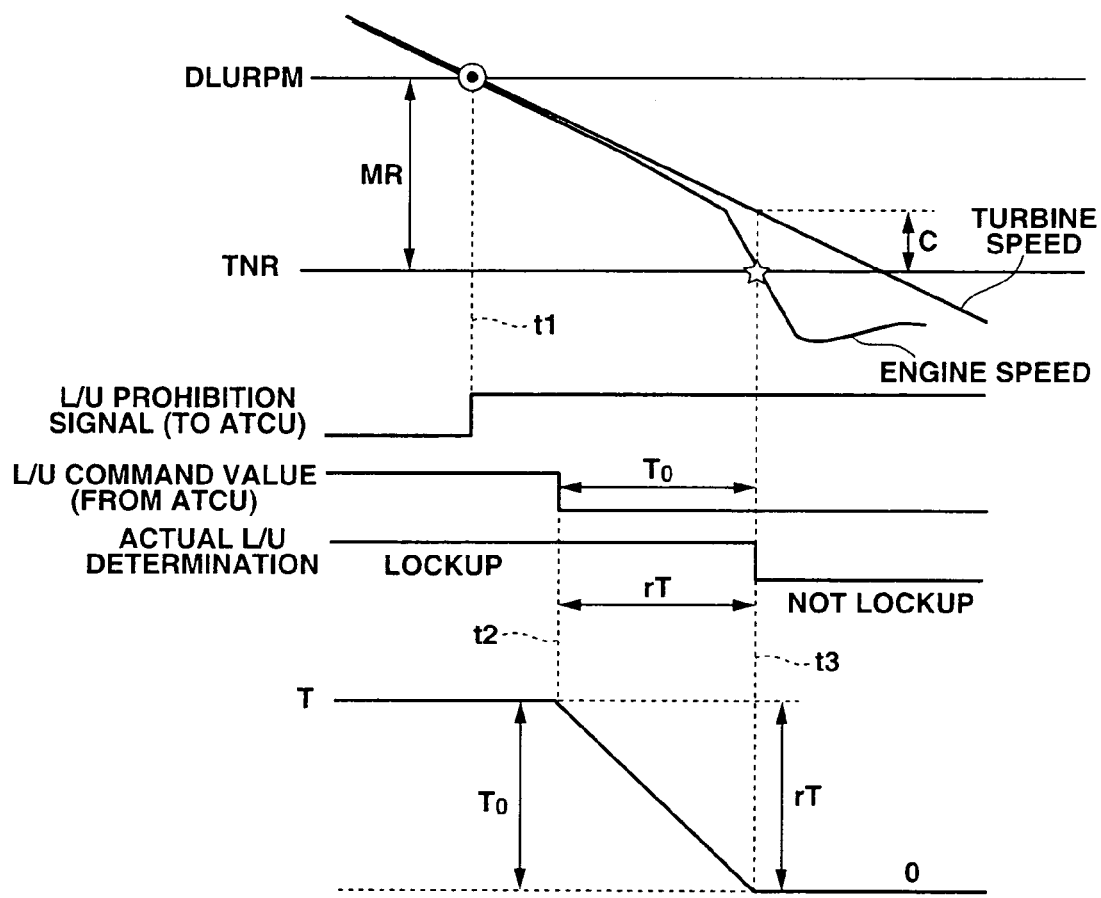
FIG. 4 is the same timing chart as FIG. 3 in a case where actual lockup release time rT is relatively long.

On the other hand, FIG. 4 shows an example of a case where actual lockup release time rT is relatively long. The actual lockup release finishes when the engine speed is decreased near to fuel-cut recovery rotational speed TNR. In a case where limit coast lockup differential-pressure P2 is high since, for example, the update and leaning of limit coast lockup differential-pressure P2 have not proceeded enough, the delay time (i.e., actual lockup release time rT) becomes long. In this case where actual lockup release time rT is relatively long, margin rotational speed MR is set to be high. Hence, lockup release rotational speed DLURPM at the next (time) deceleration becomes high. Therefore, the lockup release at the next deceleration is started earlier. Thereby, too much lowering of the engine speed and the engine stall can be assuredly avoided. Moreover, if the fuel supply is resumed under the lockup state, a much torque shock is caused. However, such a torque shock also can be assuredly (or, accurately) avoided.

Namely, even if the delay time (i.e., actual lockup release time rT) is long due to the lockup clutch engagement differential-pressure just before the lockup release is started (i.e., limit coast lockup differential-pressure P2) and the disparity in the differential-pressure control system and so on, lockup release rotational speed DLURPM is set in accordance with this delay time. Hence, the lockup release is started earlier when, for example, the vehicle is braked suddenly. Thereby, too much lowering of the engine speed and the engine stall can be assuredly avoided.

Next, a concrete processing of the control will be explained below with reference to flowcharts in FIG. 5 through FIG. 8.

Figure 5:
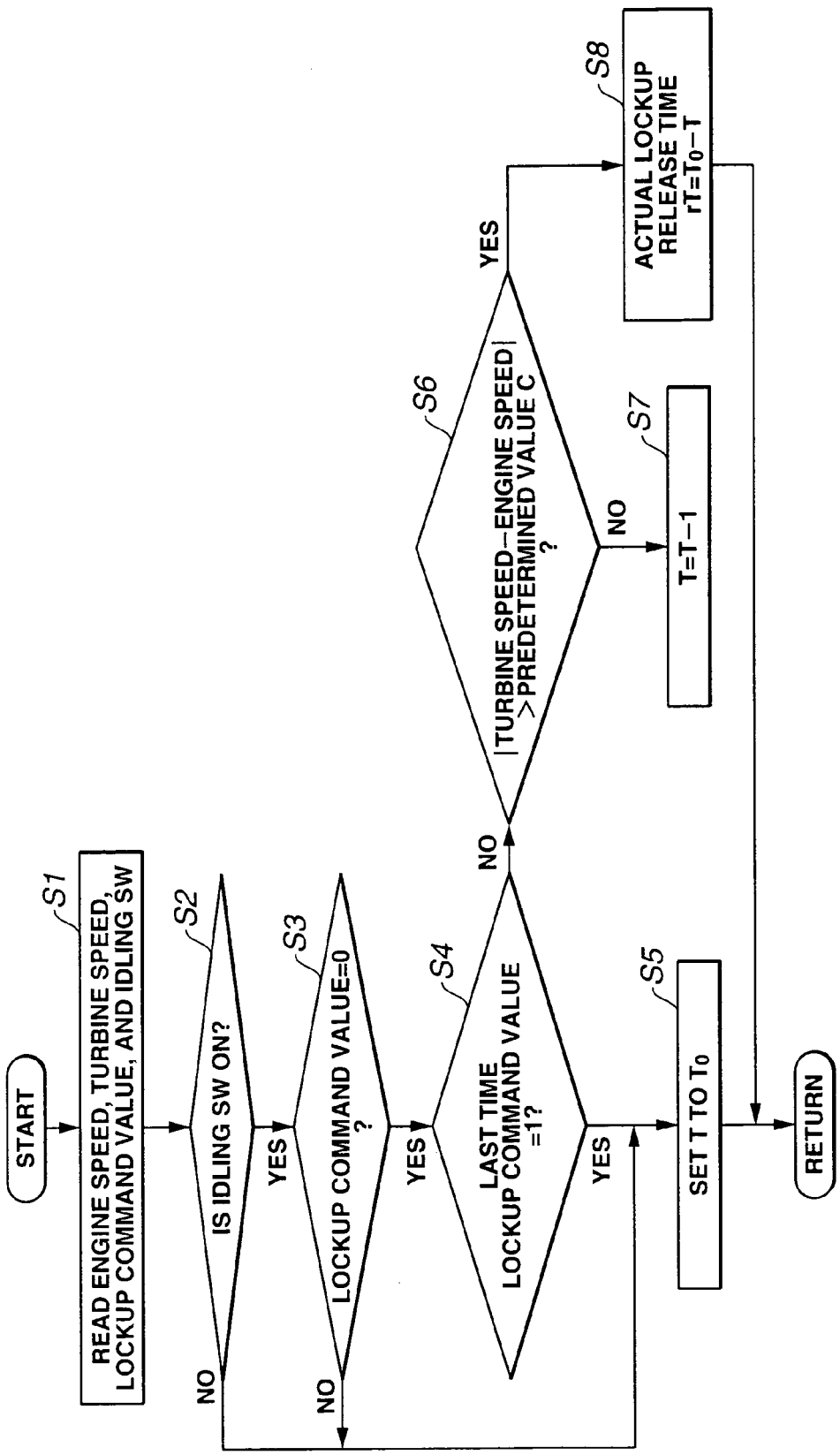
FIG. 5 is an operational flowchart representing the processing for calculating an actual lockup release time.

FIG. 5 shows an operational processing routine of the actual lockup release time for calculating the above-described actual lockup release time rT. This routine is executed as a timer interrupt routine for each of predetermined intervals, for example, for each of ten milliseconds. At first, the controller reads the engine speed, the turbine speed, a status of the lockup command value, a status of idling switch 13, and others at a step S1. At a step S2, the controller determines whether idling switch 13 is ON. If idling switch 13 is OFF (No), the routine goes to a step S5 and a timer T which is a subtraction counter is set to an initial value T0. If idling switch 13 is ON at step S2 (Yes), the routine goes to a step S3 and the controller determines whether the present lockup command value is "0" (or, OFF). This status "0" of the lockup command value means that the lockup release command is being outputted. If Yes at step S3, the routine goes to a step S4 and the controller determines whether the last time (one time previous) lockup command value is "0" (or, OFF). If No at step S3, the routine goes to a step S5 and timer T is set to initial value T0.

Since Yes at step S4 means that the lockup command value is turned from "1" to "0" immediately before, the routine goes from step S4 to step S5 and timer T is set to initial value T0. Since No at step S4 means that the lockup release is just being performed, the routine goes to step S6 and the controller determines whether the lockup release has been actually completed. More specifically, the controller determines that the lockup release has been actually completed (i.e., Yes at step S6) when the difference (absolute value) between the engine speed and the turbine speed is larger than a predetermined value C. And the controller determines that the lockup release has not been actually completed (i.e., No at step S6) when the difference between the engine speed and the turbine speed is equal to or smaller than predetermined value C. If No at step S6, the routine goes to a step S7 and the controller subtracts 1 from timer T. If Yes at step S6, the routine goes to a step S8 and the controller subtracts present timer T from initial value T0. Thereby, the controller calculates actual lockup release time rT and memorizes the calculated actual lockup release time rT.

Figure 6:
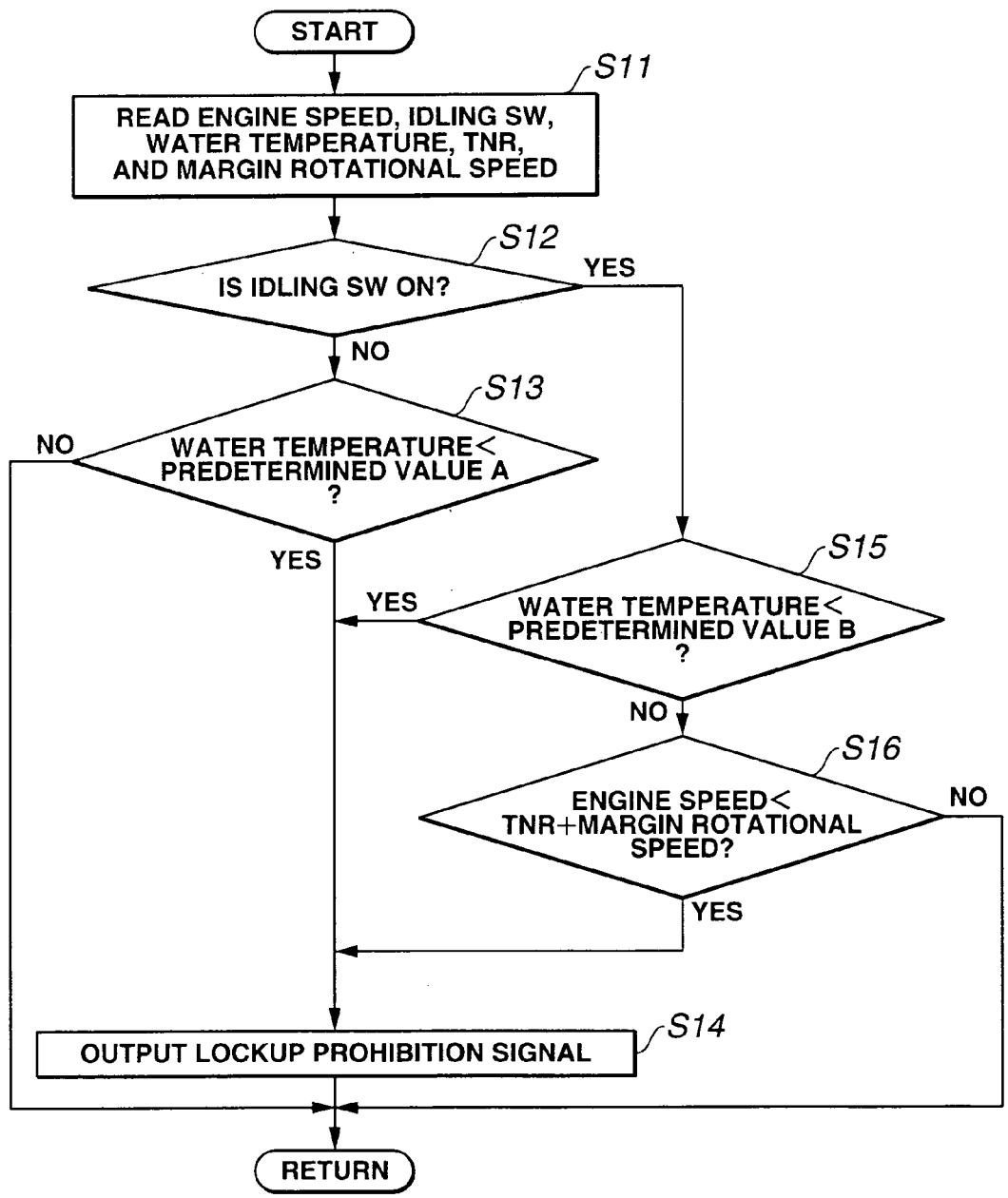
FIG. 6 is an operational flowchart representing the processing for outputting a lockup prohibition signal.

FIG. 6 shows an operational processing routine for outputting the lockup prohibition signal. This routine is also executed as a timer interrupt routine for each of predetermined intervals, for example, for each of ten milliseconds. At first, the controller reads the engine speed, the status of idling switch 13, the cooling water temperature, fuel-cut recovery rotational speed TNR, margin rotational speed MR, and others at a step S11. At a step S12, the controller determines whether idling switch 13 is ON. If idling switch 13 is OFF (No), the routine goes to a step S13 and the controller determines whether the cooling water temperature is lower than a predetermined value A (any value between 20 and 80 degrees centigrade). This predetermined value A is predetermined depending on the specification of the vehicle, for example, is predetermined from a viewpoint of maintaining the performance of an exhaust gas clean-up system using catalyst outside of the drawings. If the water temperature is lower than this predetermined value A, the lockup is not carried out. Hence, the lockup prohibition signal is outputted at a step S14.

If idling switch 13 is ON (Yes) at step S12, the routine goes to a step S15 and the controller determines whether the cooling water temperature is lower than a predetermined value B (any value between 40 and 80 degrees centigrade). This predetermined value B is predetermined depending on the specification of the vehicle, for example, is predetermined from a viewpoint of a stability of engine 1. Normally, this predetermined value B is higher than predetermined value A. If the water temperature is lower than this predetermined value B, the lockup is not carried out. Hence, the lockup prohibition signal is outputted at step S14. If the water temperature is equal to or larger than this predetermined value B, the routine goes to a step S16 and the controller compares the instantaneous (or, present) engine speed with the sum value of instantaneous fuel-cut recovery rotational speed TNR and margin rotational speed MR (i.e., lockup release rotational speed DLURPM). If the engine speed is lower than lockup release rotational speed DLURPM, the routine goes to step S14 and the lockup prohibition signal is outputted.

Figure 7:
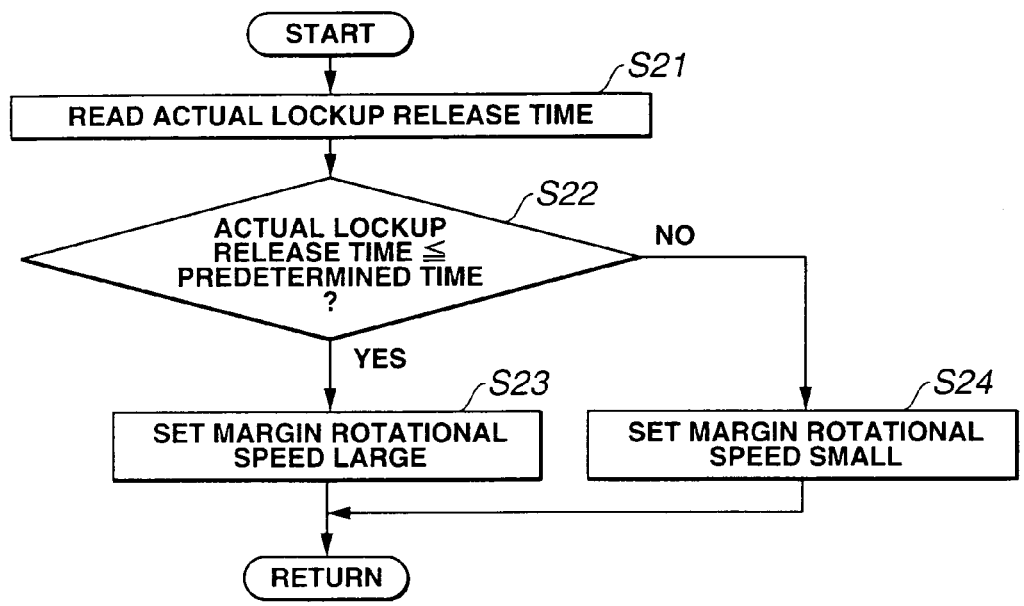
FIG. 7 is an operational flowchart representing the processing for calculating a margin rotational speed.

FIG. 7 shows an operational processing routine for setting (or, calculating) lockup release rotational speed DLURPM according to actual lockup release time rT (more specifically, setting margin rotational speed MR according to actual lockup release time rT). This routine is also executed as a timer interrupt routine for each of predetermined intervals, for example, for each of ten milliseconds. At first, the controller reads present actual lockup release time rT at a step S21. At a step S22, the controller determines whether actual lockup release time rT is equal to or smaller than a predetermined value. This predetermined value is, for example, set to any value between 300 milliseconds and 400 milliseconds depending on the performance of the transmission. If actual lockup release time rT is equal to or smaller than the predetermined value (Yes), margin rotational speed MR is set to a predetermined small value (for example, any value between 25 rpm and 50 rpm) at a step S23. If actual lockup release time rT is larger than the predetermined value (No) at step S22, margin rotational speed MR is set to a predetermined large value (for example, 100 rpm) at a step S24. Namely, margin rotational speed MR is switched between two values of the large value and the small value in this preferred embodiment. Thereby, final lockup release rotational speed DLURPM is also varied (or, switched) between two values. In addition, an initial value of actual lockup release time rT is initial value T0 (which is the initial (and, maximum) value of timer T). Therefore, lockup release rotational speed DLURPM (or, margin rotational speed MR) is set high for a first time around where actual lockup release time rT is not calculated yet. Hence, the engine stall during the deceleration of the vehicle can be assuredly (or, reliably) avoided also for the first time around.

Figure 8:
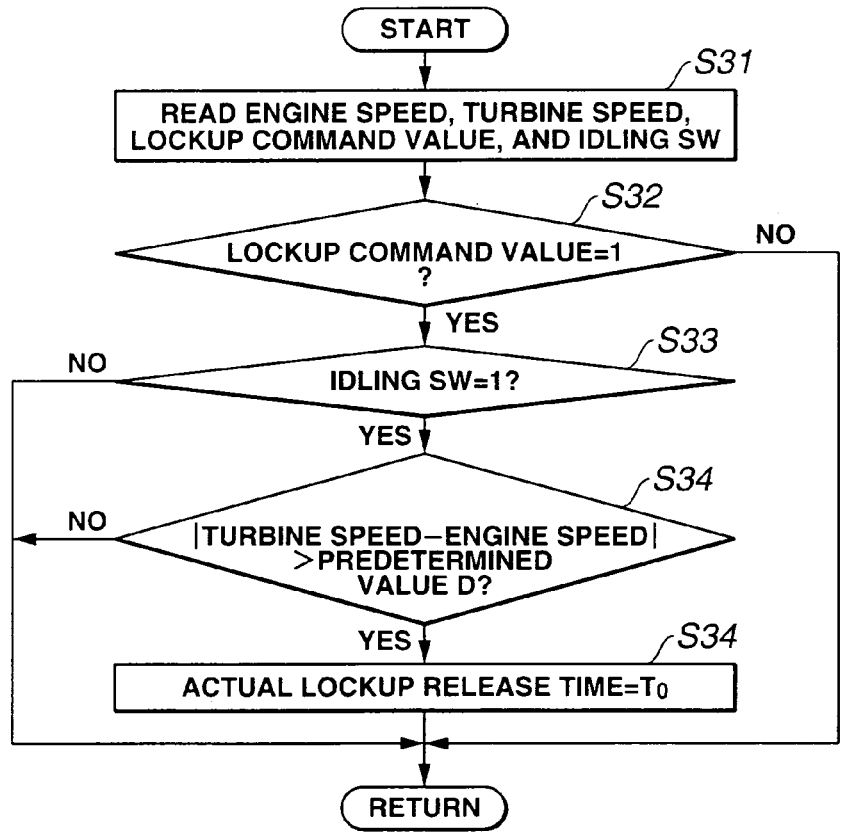
FIG. 8 is an operational flowchart representing the processing for canceling an abnormal slipping.

Next, when the difference between the input rotational speed (i.e., engine speed) and the output rotational speed (i.e., turbine speed) in the torque converter is larger than a predetermined value of the torque converter under the lockup state, this difference is an abnormal value. Hence, actual lockup release time rT had better be set to the maximum value thereof. Thereby, a setting of lockup release rotational speed DLURPM based on incorrect actual lockup release time rT can be avoided. FIG. 8 shows an operational processing routine for canceling an abnormal value of actual lockup release time rT. This routine is also executed as a timer interrupt routine for each of predetermined intervals, for example, for each of ten milliseconds. At first, the controller reads the engine speed, the turbine speed, the status of the lockup command value, the status of idling switch 13, and others at a step S31. At a step S32, the controller determines whether the torque converter is under the lockup state (specifically, whether the lockup command value is "1"). If the lockup command value is "0" (No), the routine is ended. If the lockup command value is "1" (Yes), the routine goes to a step S33 and the controller determines whether idling switch 13 is ON. If Yes (ON) at step S33, the vehicle is coasting under the lockup state. Hence, the routine goes to a step S34 and the controller determines whether the difference (absolute value) between the engine speed and the turbine speed is larger than a predetermined value D (for example, 200 rpm). Since the torque converter is under the lockup state, the turbine speed normally accords with the engine speed. If Yes at step S34, the controller determines that lockup clutch 3a is abnormally slipping and the controller sets actual lockup release time rT to the maximum (and initial) value T0 at a step S35. Thereby, lockup release rotational speed DLURPM (or, margin rotational speed MR) becomes high at the next deceleration of the vehicle. Hence, the lockup release is started earlier during the next deceleration of the vehicle and the engine stall can be assuredly avoided.

In the preferred embodiment according to the present invention, lockup release rotational speed DLURPM is varied between two steps (or, values) of the low step and the high step. However, lockup release rotational speed DLURPM can be varied among more steps (or, values) according to the present invention. Moreover, lockup release rotational speed DLURPM can be configured to be varied continuously in accordance with actual lockup release time rT.

This application is based on a prior Japanese Patent Application No. 2003-420460 filed on Dec. 18, 2003. The entire contents of this Japanese Patent Application No. 2003-420460 is hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A lockup control method for a vehicular torque converter, comprising:
   controlling a differential-pressure to a lockup clutch during a steady-state traveling state, in such a manner that the torque converter is under a steady-state lockup state where input and output elements of the torque converter are directly connected with each other by the lockup clutch under a steady-state lockup differential-pressure level;
   controlling the differential-pressure during a coasting state where an accelerator opening is completely closed, in such a manner that the torque converter is under a coast lockup state where the differential-pressure is lower than the steady-state lockup differential-pressure level;
   controlling the differential-pressure when an engine speed becomes equal to or lower than a lockup release rotational speed, in such a manner that a lockup state is released;
   calculating an actual lockup release time which is a time period between a time point at which a lockup release command for releasing the lockup state is outputted and a time point at which the lockup clutch actually becomes released in response to the lockup release command; and
   setting the lockup release rotational speed on the basis of the calculated actual lockup release time.

2. A lockup control apparatus for a vehicular torque converter, comprising:
   a lockup clutch;
   a differential-pressure controlling means for:
      controlling a differential-pressure to the lockup clutch during a steady-state traveling state, in such a manner that the torque converter is under a steady-state lockup state where input and output elements of the torque converter are directly connected with each other by the lockup clutch under a steady-state lockup differential-pressure level,
      controlling the differential-pressure during a coasting state where an accelerator opening is completely closed, in such a manner that the torque converter is under a coast lockup state where the differential-pressure is lower than the steady-state lockup differential-pressure level, and
      controlling the differential-pressure when an engine speed becomes equal to or lower than a lockup release rotational speed, in such a manner that a lockup state is released;
   an actual lockup release time calculating means for calculating an actual lockup release time which is a time period between a time point at which a lockup release command for releasing the lockup state is outputted, and a time point at which the lockup clutch actually becomes released in response to the lockup release command; and
   a lockup release rotational speed setting means for setting the lockup release rotational speed on the basis of the actual lockup release time calculated by the actual lockup release time calculating means.

3. A lockup control apparatus for a vehicular torque converter, comprising:
   a lockup clutch adapted to connect input and output elements of the torque converter with each other;
   a differential-pressure controlling section that controls a differential-pressure for the lockup clutch to:
      become a steady-state lockup differential-pressure level bringing the torque converter to a steady-state lockup state during a steady-state traveling state of a vehicle,
      become a coasting lockup differential-pressure level bringing the torque converter to a coast lockup state during a vehicular coasting state where an accelerator opening is completely closed, the coasting lockup differential-pressure level being lower than the steady-state lockup differential-pressure level, and
      start to completely release the lockup clutch and thereby start to release the coast lockup state of the torque converter, when an engine speed becomes equal to or lower than a lockup release rotational speed;
   an actual lockup release time calculating section that calculates an actual lockup release time obtained between:
      a time point at which a lockup release command for completely releasing the lockup clutch is outputted, and
      a time point at which the lockup clutch becomes actually released in response to the output of the lockup release command; and
   a lockup release rotational speed setting section that sets the lockup release rotational speed on the basis of the actual lockup release time calculated by the actual lockup release time calculating section.

4. A lockup control apparatus for a vehicular torque converter, comprising:
   a lockup clutch;
   a differential-pressure controlling section that:
      controls a differential-pressure to the lockup clutch during a steady-state traveling state, in such a manner that the torque converter is under a steady-state lockup state where input and output elements of the torque converter are directly connected with each other by the lockup clutch under a steady-state lockup differential-pressure level,
      controls the differential-pressure during a coasting state where an accelerator opening is completely closed, in such a manner that the torque converter is under a coast lockup state where the differential-pressure is lower than the steady-state lockup differential-pressure level, and controls the differential-pressure when an engine speed becomes equal to or lower than a lockup release rotational speed, in such a manner that a lockup state is released;

an actual lockup release time calculating section that calculates an actual lockup release time which is a time period between a time point at which a lockup release command for releasing the lockup state is outputted and a time point at which the lockup clutch actually becomes released in response to the lockup release command; and a lockup release rotational speed setting section that sets the lockup release rotational speed on the basis of the actual lockup release time calculated by the actual lockup release time calculating section.

5. A lockup control apparatus for a vehicular torque converter as claimed in claim 4, wherein the lockup release rotational speed setting section sets the lockup release rotational speed in such a manner that the lockup release rotational speed becomes higher as the calculated actual lockup release time is longer.

6. A lockup control apparatus for a vehicular torque converter as claimed in claim 4, wherein the actual lockup release time calculating section determines the time point at which the lockup clutch becomes actually released, according to a difference between an input rotational speed and an output rotational speed of the torque converter.

7. A lockup control apparatus for a vehicular torque converter as claimed in claim 4, wherein the lockup release rotational speed setting section sets the lockup release rotational speed to any one speed between at least two steps of speed on the basis of the actual lockup release time calculated by the actual lockup release time calculating section.

8. A lockup control apparatus for a vehicular torque converter as claimed in claim 4, wherein the lockup release rotational speed is a sum value of a fuel-cut recovery rotational speed at which a fuel supply is resumed and a margin rotational speed, the lockup release rotational speed setting section setting the lockup release rotational speed by setting the margin rotational speed on the basis of the actual lockup release time calculated by the actual lockup release time calculating section.

9. A lockup control apparatus for a vehicular torque converter as claimed in claim 8, wherein the lockup release rotational speed setting section sets the margin rotational speed to any one speed between at least two steps of speed on the basis of the actual lockup release time calculated by the actual lockup release time calculating section.

10. A lockup control apparatus for a vehicular torque converter as claimed in claim 4, wherein the lockup release rotational speed setting section sets the lockup release rotational speed to a maximum value of the lockup release rotational speed before the actual lockup release time calculating section calculates the actual lockup release time.

11. A lockup control apparatus for a vehicular torque converter as claimed in claim 4, wherein the lockup release rotational speed setting section sets the lockup release rotational speed to a maximum value of the lockup release rotational speed when a difference between an input rotational speed and an output rotational speed of the torque converter becomes larger than a predetermined value under the coast lockup state.

12. A lockup control apparatus for a vehicular torque converter as claimed in claim 4, wherein the differential-pressure controlling section controls the differential-pressure, when a temperature of engine cooling water becomes lower than a predetermined values, in such a manner that the lockup state is released.

* * * * *